(12) United States Patent
Allen

(10) Patent No.: US 12,154,323 B1
(45) Date of Patent: Nov. 26, 2024

(54) APPARATUS AND A METHOD FOR THE IDENTIFICATION OF SOURCE IMAGES ASSOCIATED WITH AN OBJECT

(71) Applicant: Davious Sports, Pittsburgh, PA (US)

(72) Inventor: Mike Allen, Pittsburgh, PA (US)

( * ) Notice: Subject to any disclaimer, the term of this patent is extended or adjusted under 35 U.S.C. 154(b) by 0 days.

(21) Appl. No.: 18/613,313

(22) Filed: Mar. 22, 2024

(51) Int. Cl.
  *G06V 10/82* (2022.01)
  *G06V 10/75* (2022.01)
(52) U.S. Cl.
  CPC .............. *G06V 10/82* (2022.01); *G06V 10/75* (2022.01)
(58) Field of Classification Search
  None
  See application file for complete search history.

(56) References Cited

U.S. PATENT DOCUMENTS

| | | | |
|---|---|---|---|
| 6,512,850 B2 | 1/2003 | Yaung | |
| 7,046,828 B1 | 5/2006 | Gibbs et al. | |
| 10,445,330 B2 | 10/2019 | Kass et al. | |
| 10,719,993 B1 | 7/2020 | Ha | |
| 2001/0010330 A1 | 8/2001 | DeFabio | |
| 2007/0200929 A1 | 8/2007 | Conaway | |
| 2010/0076976 A1 | 3/2010 | Sotirov et al. | |
| 2021/0027085 A1* | 1/2021 | Wu | G06N 5/046 |

* cited by examiner

*Primary Examiner* — Leon Flores
(74) *Attorney, Agent, or Firm* — Caldwell Intellectual Property Law

(57) ABSTRACT

An apparatus for the identification of source images associated with an object is disclosed. The apparatus includes at least processor and a memory communicatively connected to the processor. The memory instructs the processor to identify one or more unique identifiers associated with the object from the first set of image data. The memory instructs the processor to identify a subset of source image data from a second set of image data as a function of the one or more unique identifiers. The memory instructs the processor to determine a similarity score as a function of a comparison of the subset of source image data and the one or more unique identifiers. The memory instructs the processor to generate a verification report as a function of the similarity score.

18 Claims, 9 Drawing Sheets

APPARATUS AND A METHOD FOR THE IDENTIFICATION OF SOURCE IMAGES ASSOCIATED WITH AN OBJECT

FIELD OF THE INVENTION

The present invention generally relates to the field of image verification. In particular, the present invention is directed to an apparatus and a method for the identification of source images associated with an object.

BACKGROUND

The verification of objects through image analysis presents a significant technical challenge. Objects can easily be misrepresented or falsely authenticated because image analysis processes are not adequately accurate.

SUMMARY OF THE DISCLOSURE

In an aspect, an apparatus for the identification of source images associated with an object is disclosed. The memory instructs the processor to identify one or more unique identifiers associated with the object from the first set of image data. The memory instructs the processor to identify a subset of source image data from a second set of image data as a function of the one or more unique identifiers. The memory instructs the processor to compare the one or more unique identifiers with the subset of source image data. The memory instructs the processor to determine a similarity score as a function of the comparison. The memory instructs the processor to generate a verification report as a function of the similarity score.

In another aspect, a method for the identification of source images associated with an object is disclosed. The method includes receiving, using at least a processor, a first set of image data associated with an object. The method includes identifying, using the at least a processor, one or more unique identifiers associated with the object from the first set of image data. The method includes identifying, using the at least a processor, a subset of source image data from a second set of image data as a function of the one or more unique identifiers. The method includes comparing, using the at least a processor, the one or more unique identifiers with the subset of source image data. The method includes determining, using the at least a processor, a similarity score as a function of the comparison. The method includes generating, using the at least a processor, a verification report as a function of the similarity score.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the identification of source images associated with an object is disclosed. The memory instructs the processor to identify one or more unique identifiers associated with the object from the first set of image data. The memory instructs the processor to identify a subset of source image data from a second set of image data as a function of the one or more unique identifiers. The memory instructs the processor to compare the one or more unique identifiers with the subset of source image data. The memory instructs the processor to determine a similarity score as a function of the comparison. The memory instructs the processor to generate a verification report as a function of the similarity score. Exemplary embodiments illustrating aspects of the present disclosure are described below in the context of several specific examples.

Figure 1:
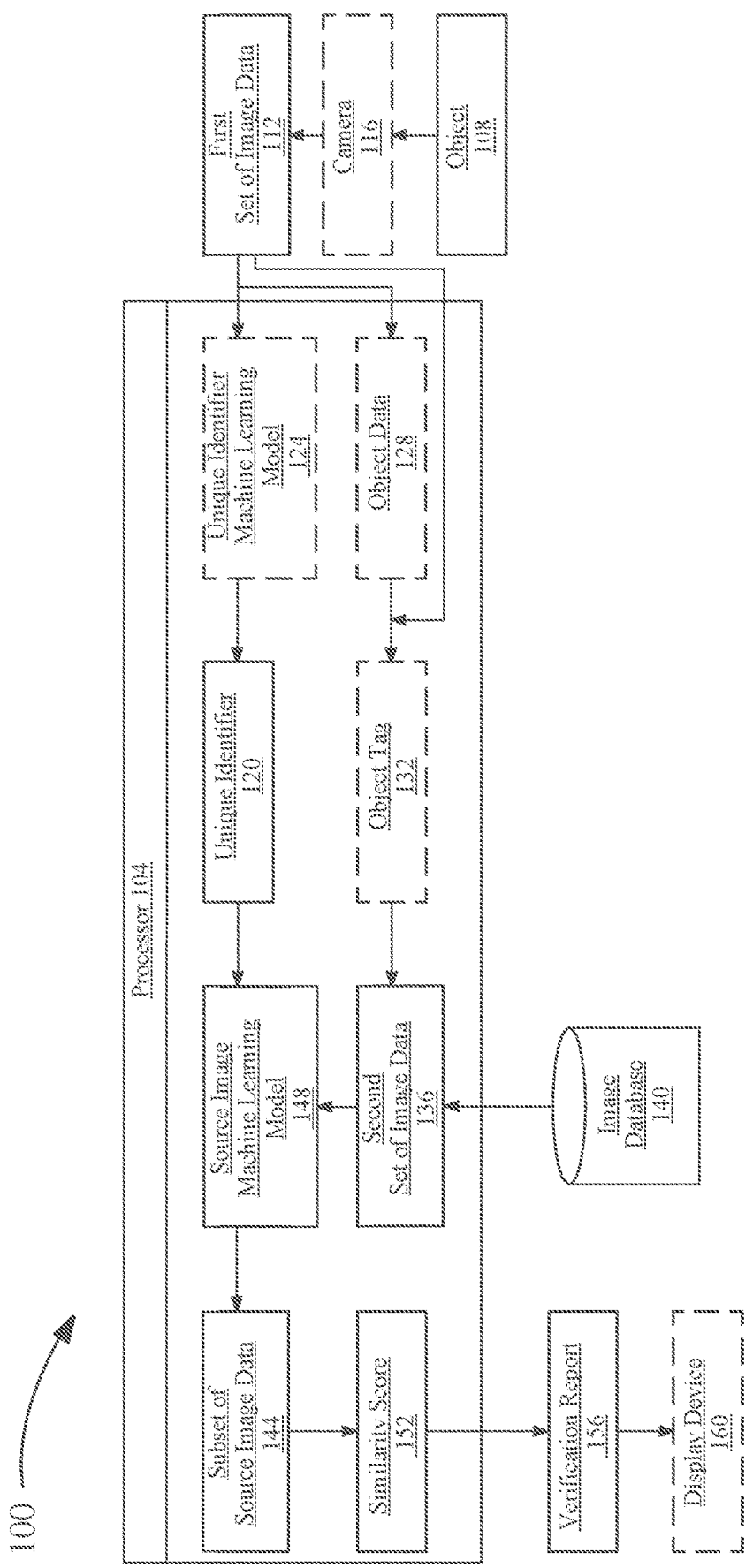
FIG. 1 is a block diagram of an exemplary embodiment of an apparatus for the identification of source images associated with an object.

Referring now to FIG. 1, an exemplary embodiment of an apparatus 100 for the identification of source images associated with an object is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, image data may be associated with an object 108. Object may include a physical and/or tangible object. Object may include a corporeal object. An object may be associated with memorable people or events. An objects may hold sentimental value, historical significance, or connection to a particular person, period, or event. As a non-limiting example, objects may include autographs and/or objects having autographs thereon, collectibles, souvenirs, personal mementos, sports memorabilia, entertainment memorabilia, historical artifacts, and the like. As used in the current disclosure, "sports memorabilia" refers to items related to sports and athletic events. Sport memorabilia may hold historical significance, sentimental value, or connection to a particular sport, team, athlete, or event. Examples of sport memorabilia may include autographed items, game-used equipment, trading cards, trophies and awards, event tickets and programs, apparel and jerseys, sport equipment, photographs and posters, and the like. In a non-limiting example, sport memorabilia may include a baseball bat that was previously owned by a notable baseball player. An object 108 may include entertainment memorabilia. As used in the current disclosure, "entertainment memorabilia" refers to items associated with the entertainment industry. This may include items from film, television, music, social media, pop culture, and theater. Entertainment memorabilia may be connected to a particular artistic work, entertainer, and the like. Entertainment memorabilia may include but is not limited to autographed items, costumes and props, posters and lobby cards, scripts and scores, vinyl records and CDs, film and music equipment, musical instruments, awards and award memorabilia, personal items belonging to an entertainer, and the like.

With continued reference to FIG. 1, apparatus 100 is configured to receive a first set of image data 112 associated with an object 108. As used in the current disclosure, "image data" refers to the digital representation of visual information associated with an object. A first set of image data 112 may include photographs, drawings, or any visual content in a format that can be stored, processed, and transmitted by processor 104. A first set of image data 112 may include a plurality of images associated with the object 108. These images may comprise multiple images covering different angles of the object, potentially providing a complete 360-degree view. These images may provide coverage for object's physical characteristics from all perspectives. A first set of image data 112 may include detailed images of every accessible portion of the object 108. This includes not just the external aspects (front, back, top, and both sides) but also, if applicable, the interior of the object. This may include the interior of any clothing items, equipment, bags, and the like. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

With continued reference to FIG. 1, image data may include a plurality of pixels. Each pixel may represent a tiny portion of the image, and the combination of these pixels forms the complete picture. Pixels in color images are typically represented through color models such as RGB (Red, Green, Blue), where each pixel has specific values for these colors. In this model, each pixel's color is determined by a mix of these three primary colors. For instance, combining red and green light at full intensity gives yellow, while all three colors at full intensity give white. In grayscale images, each pixel may represent a shade of gray. Instead of the RGB model, these images may use a single value to represent the intensity of light, with 0 typically representing black and the maximum value (like 255 in an 8-bit image) representing white. Image data may have various resolution of an image may be determined by the number of pixels it contains, this may be described in terms of width×height (e.g., 1920×1080 pixels). The image size can also refer to the file size, which depends on the image's resolution, bit depth (how many bits are used to represent each pixel), and compression. Compression may include lossy or lossless. Lossy compression (like JPEG) reduces file size by permanently removing some data, which can affect image quality. Lossless compression (like PNG) reduces file size without losing any image quality.

Still referring to FIG. 1, apparatus 100 may additionally include at least a camera 116. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared.

With continued reference to FIG. 1, processor 104 may be configured to identify one or more unique identifiers 120 associated with the object 108. As used in the current disclosure, a "unique identifier" is a distinctive mark or feature that can be used to recognize and differentiate object 108 from similar objects. This identifier may be one or more physical characteristics that are unique to the object, ensuring that it can be individually identified based on its appearance alone. Unique identifiers 120 may include any writing or text that is located on the object 108. This may include the font and style of the text that is located on the object. This may mean each object has one or more distinct features that set it apart visually from similar objects. These could be natural variations, manufacturing anomalies, or signs of wear and use. A unique identifier 120 may be the location or proximity of corporeal characteristics of an object in relation to one another. This may refer to the specific arrangement or pattern of physical features on the object. The unique identifier may not just be the features themselves, but their relative positioning. For example, the way in which certain markings, shapes, or components are arranged can form a unique pattern. Unique identifiers 120 may be specific tears or stains located in certain areas. These physical deformities may be unique in their shape, size, location, and how they interact with the clothing's design and fabric. Since these features are often random and uncontrolled, they provide a high degree of uniqueness. Unique identifiers 120 that include physical deformities are not limited to clothing. Tears in materials like fabric, paper, or leather can serve as unique identifiers. Each tear has its own characteristics-its location, direction, length, and shape. For example, a tear on the cover of a book will differ in every instance due to the random nature of how the material rips. In an embodiment, Stains, whether from liquids, dirt, or other substances, may also provide a unique pattern that is suitable for a unique identifier 120. The size, shape, color, intensity, and location of the stain contribute to its uniqueness. For instance, a coffee stain on a canvas bag may have a different spread, intensity, and border in each case. Wood grain is a natural and unique pattern found in wooden objects. Each piece of wood has a distinctive grain pattern, which can serve as a natural identifier. For example, in a baseball bat, the lines, waves, and color variations in the wood grain can uniquely identify that specific bat. In an embodiment, unique identifiers 120 may also include an identification number associated with the object such as a serial number. In an additional embodiment, unique identifier 120 may become even more distinct when combining multiple unique identifiers 120, such as both tears and stains. The interplay between where the item is torn and where it is stained creates a complex pattern that is highly unlikely to be replicated exactly on another item. In an embodiment, unique identifier 120 may include the color of the object 108. For example, a unique identifier 120 may include the RGB decimal value associated with one or more colors of the object.

With continued reference to FIG. 1, a unique identifier 120 for an item of clothing may be described as the specific placement of alphanumeric characters or patches in relation to the mesh holes in an item of clothing. Alphanumeric characters or patches could be letters, numbers, symbols, or a combination thereof, and/or decorative or functional patches affixed to the item of clothing. Their design, size, and color could vary, but they are distinct elements added to the garment. Mesh holes may refer to the openings or gaps formed within a mesh fabric used in the garment. This mesh fabric may form a repeating pattern of mesh holes throughout the garment. The unique identifier 120 may be an identification of how these alphanumeric characters or patches are placed in relation to the mesh holes. They may cover the holes completely, partially, or not at all, creating a unique pattern. For instance, a character might partially cover a hole, be positioned between holes, or be aligned in a specific pattern around the holes. The distinctive nature of this placement may serve as a unique identifier 120. This overlapping and juxtaposition of characters with the mesh holes may form a specific pattern. For instance, if the character is a letter 'A,' the triangular shape of the letter might encase some holes, partially cover others, and leave some areas of the mesh untouched. This pattern may be unique to specific article of clothing. The pattern's uniqueness may be accentuated by the clear definition of where the characters' edges meet the mesh holes. This can create a visually striking effect, with the mesh holes appearing to form a border or outline around the characters. The processor 104 may be configured to identify and analyze this unique placement of characters using edge detection techniques. This may focus on the edges of the alphanumeric characters or patches to determine their exact placement relative to the mesh holes. By focusing on the edges of the characters or patches, the processor can accurately map their location and how they interact with the mesh holes.

With continued reference to FIG. 1, processor 104 may be configured to identify first set of image data 112 associated with the object 108 from the first set of image data 112. The first set of image data 112 may undergo pre-processing. Preprocessing image data may involve several steps to enhance and prepare images for further analysis or processing. This may include adjusting the image's brightness and contrast to improve clarity and detail visibility. Images may also be resized or cropped to focus on relevant areas, reduce computational load, and/or to size images to a number of inputs required for a machine-learning model and/or neural network. Additionally, noise reduction techniques can be applied to remove unwanted artifacts, and the image can be converted to grayscale or a specific color space to simplify the analysis. Processor 104 may use feature detection to identify and extract significant elements or patterns within an image that are relevant for analysis. This process may employ algorithms, such as unique identifier machine learning model 124, to detect specific attributes like edges, corners, contours, or textures. Feature recognition may include recognizing more complex patterns, such as specific shapes or unique markings, which may be used for tasks like object recognition or classification. Processor 104 may analyze these features to identify the unique identifiers 120. For example, if the unique identifier is a specific pattern of scratches, the software looks for that exact pattern in the image. The processor 104 may employ pattern recognition algorithms to analyze these features. This may involve comparing the extracted features with known patterns or characteristics. For instance, in the case of a unique identifier 120 like a specific set of scratches or a distinct wood grain pattern, the processor looks for similar patterns in its database or uses trained models to recognize these features. For some unique identifiers, the processor 104 might analyze the geometry and spatial relationship of features. This is particularly important if the identifier is based on the arrangement or relative position of features (like the proximity of certain marks or the layout of unique deformities). In some cases, the processor 104 may also consider the context or conditions under which the image was taken. Factors like lighting, angle, and shadows can affect how features appear. The processor 104 may adjust its analysis to account for these variables.

Still referring to FIG. 1, apparatus 100 may include a machine vision system that is configured to identify one or more unique identifiers 120. A machine vision system may use images from at least a camera 116, to make a determination about a scene, space, and/or object 108. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x, and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, one or more unique identifiers 120 may be identified using an image processing module. As used in this disclosure, an "image processing module" is a component designed to process digital images. In an embodiment, image processing module may include a plurality of software algorithms that can analyze, manipulate, or otherwise enhance an image, such as, without limitation, a plurality of image processing techniques as described below. In another embodiment, image processing module may slow include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like.

Still referring to FIG. 1, image processing module may be configured to receive the first set of image data 112 from at least a camera 116. In a non-limiting example, image processing module may be configured to receive images by generating a first image capture parameter, transmitting a command to camera 116 take first image of a plurality of images with the first image capture parameter, generate a second image capture parameter, transmit a command to camera 116 to take second image of a plurality of images with the second image capture parameter, and receive, from optical system, first image and second image. In another non-limiting example, first set of image data 112 may be taken by camera 116 using the same image capture parameter. Image capture parameter may be generated as a function of user input or processor 104.

Still referring to FIG. 1, first set of image data 112 may be transmitted to image processing module via any suitable electronic communication protocol, including without limitation packet-based protocols such as transfer control protocol-internet protocol (TCP-IP), file transfer protocol (FTP) or the like. Receiving images may include retrieval of images from a data store containing images as described below; for instance, and without limitation, images may be retrieved using a query that specifies a timestamp that images may be required to match.

Still referring to FIG. 1, image processing module may be configured to process images. In an embodiment, image processing module may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing module may be configured to perform a lossless compression on images, wherein the lossless compression may maintain the original image quality of images. In a non-limiting example, image processing module may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on plurality of images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

Still referring to FIG. 1, in an embodiment, processing images may include determining a degree of quality of depiction of a portion of the image containing one or more unique identifiers 120 (as described in further detail below). The degree of quality of depiction may be used in identifying unique identifiers 120 or tagging objects within an image. By improving the clarity and distinction of features, these processes make it easier to recognize and differentiate specific objects or markers. For instance, converting an RGB image to grayscale can highlight intensity differences, making it easier to spot unique identifiers 120 amidst varying backgrounds. Similarly, image sharpening enhances edge definition, aiding in the precise detection of object boundaries for accurate tagging. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a one or more unique identifiers 120 and select a highest-ranking image from a plurality of images.

Still referring to FIG. 1, processing images may include enhancing at least a portion of the image containing a one or more unique identifiers 120. This may be done using a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

Still referring to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction.) Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

Still referring to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a portion of an image and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a portion of an image by emphasizing high-frequency components within an image.

Still referring to FIG. 1, processor 104 may be configured to identify one or more unique identifiers 120 from the rest of an image as a function of plurality of image processing techniques. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a portion of an image may include applying a dilation operation, wherein the dilation operation is a basic morphological operation configured to expand or grow the boundaries of objects (e.g., a physical deformity, a tear, a stain, and the like) in an image. In another non-limiting example, isolating a portion of an image may include applying an erosion operation, wherein the erosion operation is a basic morphological operation configured to shrink or crode the boundaries of objects in an image. In another non-limiting example, isolating a portion of an image may include applying an opening operation, wherein the opening operation is a basic morphological operation configured to remove small objects or thin structures from an image while preserving larger structures. In a further non-limiting example, isolating a portion of an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a portion of an image before further processing.

Still referring to FIG. 1, in an embodiment, isolating a portion of an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Still referring to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing as described below.

Still referring to FIG. 1, in an embodiment, isolating feature of interest from an image may include segmenting a region depicting a feature of interest into a plurality sub-regions. Segmenting a region into sub-regions may include segmenting a region as a function of feature of interest and/or CCA via an image segmentation process. As used in this disclosure, an "image segmentation process" is a process for partition a digital image into one or more segments, where each segment represents a distinct part of the image. Image segmentation process may change the representation of images. Image segmentation process may be performed by image processing module. In a non-limiting example, image processing module may perform a region-based segmentation, wherein the region-based segmentation involves growing regions from one or more seed points or pixels on an image based on a similarity criterion. Similarity criterion may include, without limitation, color, intensity, texture, and/or the like. In a non-limiting example, region-based segmentation may include region growing, region merging, watershed algorithms, and the like.

With continued reference to FIG. 1, processor 104 may identify one or more unique identifiers 120 using a unique identifier machine-learning model 124. As used in the current disclosure, a "unique identifier machine-learning model" is a machine-learning model that is configured to generate one or more unique identifiers 120. unique identifier machine-learning model 124 may be consistent with the machine-learning model described below in FIG. 2. Inputs to the unique identifier machine-learning model 124 may include first set of image data 112 associated with an object 108, examples of one or more unique identifiers 120, and the like. Outputs to the unique identifier machine-learning model 124 may include one or more unique identifiers 120 tailored to the first set of image data 112 associated with an object 108. unique identifier training data may include a plurality of data entries containing a plurality of inputs that are correlated to a plurality of outputs for training a processor by a machine-learning process. In an embodiment, unique identifier training data may include a plurality of a first set of image data 112 associated with an object 108 correlated to examples of one or more unique identifiers 120. unique identifier training data may be received from image database 140. unique identifier training data may contain information about a first set of image data 112 associated with an object 108, examples of one or more unique identifiers 120, and the like. In an embodiment, unique identifier training data may be iteratively updated as a function of the input and output results of past unique identifier machine-learning model 124 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

Still referring to FIG. 1, a unique identifier machine-learning model 124 may be trained to identify and differentiate various unique characteristics from a large dataset of images. This model may improve over time with more data, becoming more accurate in identifying specific features. Unique identifier training data may include a large dataset of images of unique identifiers 120. These images may include a wide range of images capturing exemplary object from various angles and under different lighting conditions. This diversity ensures that the model can accurately recognize unique identifiers in a variety of real-world scenarios. These images may be images of exemplary objects that may have their unique identifiers labeled. This labeling may involve outlining specific features, annotating areas of interest, or tagging the images with descriptive information about the unique identifiers. This dataset may be representative of the actual population of objects the model will encounter. This means including variations in object types, sizes, colors, and the unique identifiers themselves, ensuring the model can generalize well when deployed in real situations. To enhance the robustness of the model, the training dataset can be augmented by artificially creating variations of the images, such as by rotating, scaling, or adding noise. This helps the model to learn to identify the unique identifiers under various conditions. In an embodiment, dataset may also include negative examples, i.e., images of objects that do not have the unique identifiers or have different identifiers.

With continued reference to FIG. 1, Image processing techniques may be used to improve upon machine learning model training processes. By filtering and enhancing the first set of image data, the overall quality of the dataset improves. This improvement may directly impact the performance of machine learning algorithms, as clearer, more defined images allow for more accurate feature extraction and classification. For example, morphological operations can help isolate and emphasize relevant features within the training data, reducing noise and irrelevant information. Consequently, models trained on this high-quality data are better equipped to generalize from the training dataset to real-world applications, leading to increased accuracy and reliability in tasks like object recognition, segmentation, and classification.

With continued reference to FIG. 1, in an embodiment, unique identifier machine-learning model 124 may comprise a deep neural network (DNN). As used in this disclosure, a "deep neural network" is defined as a neural network with two or more hidden layers. Neural network is described in further detail below with reference to FIGS. 4-5. In a non-limiting example, unique identifier machine-learning model 124 may include a convolutional neural network (CNN.) Identifying one or more unique identifiers 120 using a unique identifier machine-learning model 124 may include training CNN using unique identifier training data and identifying one or more unique identifiers 120 from the first set of image data 112 using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., first set of image data 112 through a sliding window approach. In some cases, convolution operations may enable processor 104 to detect local/global patterns, edges, textures, and any other features described herein within first set of image data 112. Spatial features may be passed through one or more activation functions, such as without limitation, Rectified Linear Unit (ReLU), to introduce non-linearities into the processing step of identifying one or more unique identifiers 120. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features.

Still referring to FIG. 1, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, one or more unique identifiers 120. Further, each fully connected layer may be followed by one or more dropout layers configured to prevent overfitting, and one or more normalization layers to stabilize the learning process described herein.

With continued reference to FIG. 1, in an embodiment, training the unique identifier machine-learning model 124 (i.e., CNN) may include selecting a suitable loss function to guide the training process. In a non-limiting example, a loss function that measures the difference between the predicted one or more unique identifiers 120 and the ground truth 3D structure e.g., Unique identifier training data may be used, such as, without limitation, mean squared error (MSE) or a custom loss function may be designed for one or more embodiments described herein. Additionally, or alternatively, optimization algorithms, such as stochastic gradient descent (SGD), may then be used to adjust the unique identifier machine-learning model's 124 parameters to minimize such loss. In a further non-limiting embodiment, instead of directly predicting one or more unique identifiers 120, unique identifier machine-learning model 124 may be trained as a regression model to predict the uniqueness of the one or more unique identifiers 120. Additionally, CNN may be extended with additional deep learning techniques, such as recurrent neural networks (RNNs) or attention mechanism, to capture additional features and/or data relationships within input data. These extensions may further enhance the accuracy and robustness of the identification of the one or more unique identifiers 120.

With continued reference to FIG. 1, processor 104 may be configured to generate object data 128 as a function of the first set of image data 112 and the unique identifiers 120. As used in the current disclosure, "object data" is data related to the object. Object data 128 may include various details about the object. This may include details about the object including the place of origin, person/team/event the object is associated with, timelines associated with the object, and the like. Timelines may include chronological information related to the object's history. This might include dates of creation, moments of significance (like when it was used in an event), periods of ownership, etc. In an embodiment, object data 128 may include the ownership history of the object, showing how it has changed hands over time. This may be relevant to authenticate the object 108 using chain o where provenance plays a significant role in value assessment. Object data 128 may include information about the significant historical, cultural, or sporting events that is associated with the object 108. This may include the date or dates the object was used and who specifically used the object. These occurrences may be noted in the timeline for the object.

With continued reference to FIG. 1, processor 104 may be configured to identify the key elements or subjects present in the image. This could include objects, people, locations, colors, activities, event, or any other notable aspect. The identification of key features within the first set of image data 112 may include detecting and extracting features from the first set of image data 112. This may involve identifying distinct patterns, shapes, colors, and textures within the images. Algorithms such as edge detection, corner detection, and blob detection may be used to extract features from the first set of image data 112. These algorithms help in breaking down the image into identifiable features that can form the basis for recognizing more complex patterns or subjects. Once features are extracted, the processor 104 may employ pattern recognition algorithms to identify objects or subjects within the image. This can involve comparing the extracted features against a pre-defined set of known patterns (such as shapes or textures associated with certain objects). For instance, the processor might look for specific arrangements of edges and corners that match the typical features of a car, a face, or a building. In some cases, machine learning techniques, particularly deep learning techniques may be used to identify specific arrangements of edges and corners. Neural networks, especially Convolutional Neural Networks (CNNs), may be trained on large datasets of labeled images to learn to recognize various objects and subjects. Once trained, these models may analyze new images and identify key elements with high accuracy. The effectiveness of this approach relies heavily on the quality and diversity of the training dataset. In addition to recognizing individual elements, the processor 104 can also perform contextual analysis to understand the scene depicted in the image. This may involve analyzing the relationship between different elements within the image, like the spatial arrangement and size relations. For example, in an image of a street scene, the processor might identify cars, people, buildings, and trees, and understand how these elements are positioned in relation to each other. In an embodiment, processor 104 may employ semantic segmentation to the first set of image data 112. This may include classifying, by the processor, each pixel in the image into different categories based on what object it belongs to. This helps in obtaining a detailed understanding of the image, including the shapes and boundaries of various elements.

With continued reference to FIG. 1, generating object data 128 may include tagging the first set of image data 112 with object tag 132 associated with the object 108. As used in the current disclosure, an "object tag" refers to a label or identifier that is assigned to a specific object within an image. This may be done to facilitate recognition, categorization, and tracking of the object 108. This tag can be a textual descriptor, a numeric code, or any form of metadata that provides information about the object. Tagging a first set of image data 112 with object tags 132 may be a process that involves assigning descriptive labels or keywords to images to facilitate easier categorization, search, and retrieval. This process can be manual or automated. Processor 104 may be configured to identify the key elements or subjects present in the image. This could include objects, people, locations, colors, activities, or any other notable aspect. Based on the identified elements, object tags 132 may be assigned to each image. In a non-limiting example, if the object 108 is a purple guitar. Processor 104 may identify and tag the object 108 as a "guitar," "Gibson guitar," "electric guitar,"

"Purple," "Semi-hollow body," "1976-1982," "Prince," and the like. Object tags 132 may include tags related to the name of the object, date of manufacture of the object, date of use of the object, manufacturer of the object, color of the object, name of the person/event that is associated with the object, and the like. Artificial intelligence and machine learning algorithms may be used to automatically tag images. These systems are trained to recognize various elements in images and assign appropriate tags without human intervention. In an embodiment, processor 104 may match one or more unique identifiers 120 to an associated object tag 132. For example, if the unique identifier 120 includes an RGB decimal value associated with a portion of the object. Processor 104 may match the RGB decimal value to an object tag 132 associated with that color value.

With continued reference to FIG. 1, processor 104 may be configured to implement hierarchical object tags or multi-level object tags. As used in the current disclosure, a "hierarchical object tag" refers to a system of labeling or categorizing objects within images that is structured in multiple levels, from general to specific. In this system, object tags 132 may be organized in a hierarchy, where each level of the tag provides increasingly detailed information about the object, where tags are organized in a structured manner, from general to specific. Hierarchical tagging of an object may involve organizing tags in a structured, layered manner, where each tag represents a level of specificity or categorization related to the object. This method starts with broad, general tags at the top level and progresses to more specific, detailed tags at lower levels. For example, for an image of a car, the top-level tag might be "clothing," followed by more specific tags like "jersey" at the next level, then even more detailed tags such as "football jersey," "Baltimore Ravens Jersey," "Lamar Jackson Jersey," and so on. This approach not only helps in categorizing objects more accurately but also facilitates refined search and retrieval, allowing users to navigate from general categories down to the most specific aspects of the object.

With continued reference to FIG. 1, processor 104 may generate object data 128 using an object machine-learning model. As used in the current disclosure, an "object machine-learning model" is a machine-learning model that is configured to generate object data 128 and/or assign object tags 132 to images. Object machine-learning model may be consistent with the machine-learning model and/or classifiers described below in FIG. 2. In some embodiments, an object machine-learning model may include a classifier that is configured to classify images to object tags. Inputs to the object machine-learning model may include a first set of image data 112, unique identifiers 120, examples of object data 128, and the like. Outputs to the object machine-learning model may include object data 128 tailored to the first set of image data 112. Object training data may include a plurality of data entries containing a plurality of inputs that are correlated to a plurality of outputs for training a processor by a machine-learning process. In an embodiment, object training data may include a plurality of first set of image data 112 correlated to examples of object data 128. In another embodiment, object training data may include a plurality of object tags 132 correlated to first set of image data 112. Object training data may be received from image database 140. Object training data may contain information about first set of image data 112, unique identifiers 120, examples of object data 128, examples of object tags 132, and the like. In an embodiment, object training data may be iteratively updated as a function of the input and output results of past object machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may be configured identify a second set of image data 136. As used in the current disclosure, a "second set of image data" encompasses a large collection of images that depict a wide variety of scenes. The scenes captured in these images could range from concerts, sporting events, historical events, indoor scenes to specific events, activities, or historical moments. The second set of image data 136 may encompass a large number of potential objects 112 that can be identified and analyzed. This could include everything from clothing items worn by people in the images, equipment used in sporting events, instruments in concerts, to artifacts present in historical event images. The second set of image data 136 may feature a wide array of subjects, including people in various settings and activities. There may be photographs of athletes in action, entertainers performing, famous personalities in public appearances, ordinary people in daily life situations, and the like. The second set of image data 136 prominently features images from notable events, such as concerts, sporting events, and significant historical occurrences. These images capture moments of cultural, social, and historical importance, showcasing performers, athletes, audiences, and key moments from these events. The dataset includes images of well-known figures across various fields-celebrities, sports stars, political figures, entertainers, and other public figures. These images might capture these individuals in different contexts, from formal public appearances to candid shots in more personal settings.

With continued reference to FIG. 1, processor 104 may identify the second set of image data 136 by querying an image database 140 using object data 128. As used in the current disclosure, an "image database" is a structured collection of digital images that are stored, managed, and organized in a way that allows for efficient retrieval, access, and analysis. Image database 140 may serve as a repository for a wide range of images, which could include photographs, illustrations, diagrams, and other visual content. The images are stored in digital formats such as JPEG, PNG, GIF, TIFF, etc. Images in the image database 140 may be organized systematically, potentially categorized by various criteria such as subject matter, date, location, creator, subject, event, or any other relevant metadata. This organization facilitates easy navigation and retrieval of images. Image database 140 may include search functions allowing users to find specific images based on keywords, tags, descriptions, or other metadata. Some image databases also employ image recognition technology to allow searching by visual content or patterns. Each image within the image database 140 may be accompanied by metadata, which may include descriptive information like the title, date of creation, author, and any other pertinent data that provides context about the image.

With continued reference to FIG. 1, processor 104 may be communicatively connected with image database 140. For example, in some cases, image database 140 may be local to processor 104. Alternatively, or additionally, in some cases, image database 140 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. image database 140 may be implemented, without limitation, as a relational database, a key-value retrieval database such as a NOSQL database, or any other format or structure for use as a database that a person skilled in the art would recognize as suitable upon review of the entirety of this disclosure. image database 140 may alternatively or additionally be implemented using a distributed data storage protocol and/or data structure, such as a distributed hash table or the like. image database 140 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 104 may be configured to identify the second set of image data 136 by querying an image database 140 using object data 128. Processor 104 may be configured to clearly define the criteria for the images you want to retrieve. This could involve specifying keywords, date ranges, locations, subjects, or any other relevant parameters that align with the contents of the second set of images you are seeking. This search criteria may be generated based on the object data 128 associated with the object. Based on the search criteria, processor 104 may construct a query to retrieve the images. If the database has a user interface, this might involve entering search terms into a search bar or using filter options. For programmatic access, construct a query in the appropriate query language or API request format. In an embodiment, the query may be broad to identify all relevant images. Processor 104 may be configured to run the query against the database. In a user interface, this might be as simple as clicking a 'search' button. In a programmatic context, it may involve sending an API request or executing a database query command. Once the query is executed, processor 104 may be configured to process the search results. This could mean browsing through the returned images manually in a user interface or parsing the results programmatically if using an API or a database query. From the search results, processor 104 may select the second set of image data 136 that meet at least some of the requirements. Examples of requirements include images depicting a specific event or a specific date and location. In some cases, selecting the second set of image data 136 may include downloading these images directly.

With continued reference to FIG. 1, second set of image data 136 may be generated using a web crawler. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile second set of image data 136 and/or object data 128. The web crawler may be seeded and/or trained with a reputable website, such as a website affiliated with Associated Press or Getty Images, to begin the search. In some embodiments, the web crawler may be trained/seeded with information received from a user through a user interface. In other embodiments, the web crawler may be configured to generate a web query. A web query may include search criteria based on object tags 132 or object data 128. For example, a user may submit a plurality of websites for the web crawler to search for images of the 2007 NBA Finals. In some cases, a web crawler may be seeded with a social media website or a public/private image database. The process of seeding a web crawler refers to the process of providing an initial set of URLs or starting points from which, the crawler begins its exploration of the web. These initial URLs are often called seed URLs or a seed set. Seeding may be a curtail step in the web crawling process as it defines the starting point for discovering and indexing web pages.

With continued reference to FIG. 1, processor 104 may be configured to filter the second set of image data 136 as a function of the hierarchical object tags. Filtering the second set of image data 136 using hierarchical object tags may involve selectively narrowing down the collection of images based on a structured system of tags that represent different levels of information about the objects within those images. The filtering process may be an iterative or recursive process. In an embodiment, the filtering process may begin at the highest level of the hierarchical tags, which are the most general categories. For instance, if you are dealing with a diverse image dataset, the top-level tags might be broad categories like "Entertainment," "Sports," "People," "Events," etc. From the broad categories, the filtering process may move to specific subcategories. Under each top-level tag, there are secondary tags that provide more detail. For example, under the "People" category, there might be tags like "Athletes," "Entertainers," "Public Figures," and so on. In some cases, images can be associated with multiple tags at different levels. For instance, an image of a famous musician performing at a concert might be tagged under "Entertainers" as well as "Concerts" under the "Events" category. The filtering process can utilize these multiple tags to precisely narrow down the images. In an embodiment, a user can select and combine tags at various levels to refine the image dataset. For example, selecting "Events" followed by "Sports" and then "Olympics" would filter the images to show only those related to Olympic events.

With continued reference to FIG. 1, processor 104 is configured to identify a subset of source image data 144 from a second set of image data 136 as a function of the one or more unique identifiers 120. As used in the current disclosure, "source image data" is digital representation of visual information associated with one or more objects captured at some point in the past. Source image data 144 may be a collection of images depicting the objects in various contexts and scenarios. The source image data 144 may showcase the object in action or in use, often linked to significant events, interactions with famous personalities, moments of cultural importance, or during sporting events. Source image data 144 may depict the objects in significant scenarios-whether in action, in use by notable personalities, or during important events. For example, source images for a guitar might show it being played by a famous musician at a landmark concert, while for a signed football, the images could depict it in play during a key match or at the moment of singing by a renowned athlete. In another non-limiting example, source image data 144 may include images of sports memorabilia in use by the athlete. To identify relevant source image data 144, computer vision and pattern recognition algorithms may be employed. These technologies may scan through images to detect and recognize the unique identifiers 120 associated with the objects 108. For example, if a unique identifier 120 is a distinct pattern or a serial number on an object 108, the processor may search for these specific markers within a multitude of images. This may include accessing extensive databases or repositories that contain not just images but also related historical data of the objects. These databases are linked to the unique identifiers 120, enabling the processor 104 to draw connections between the identifier and the corresponding image data. Upon recognizing a unique identifier 120 within the source image data 144, the processor may retrieve relevant images associated with that unique identifier 120 from the database.

With continued reference to FIG. 1, processor 104 may be configured to identify one or more unique identifiers 120 within the second set of image data 136. Identifying one or more unique identifiers 120 within the second set of image data 136 may involve identifying specific, distinguishable features or markers within the images. In an embodiment, processor may employ machine vision techniques, as mentioned herein above, to analyze the second set of image data 136. This may involve analyzing the visual content of each image of the second set of image data 136 to locate potential matches to the defined unique identifiers 120. Within each image, the processor 104 may extract features that are relevant to the unique identifiers. This could involve detecting text, recognizing specific shapes, or identifying unique patterns or color schemes. This may be done using any feature extraction process discussed herein. The extracted features may then be compared against the defined unique identifiers 120 using pattern recognition algorithms. This step may identify the correspondences between the features in the set of image data 136 and the characteristics of the unique identifiers 120. In some cases, processor 104 may be configured to employ machine learning models, particularly those trained in object recognition, to identify the unique identifiers 120. These models may be trained on vast datasets to recognize a wide range of features and can efficiently process large sets of image data. In some cases, once the unique identifier 120 is identified within an image, that image may be tagged or cataloged accordingly.

With continued reference to FIG. 1, processor 104 is configured to identify a subset of source image data 144 using one or more object tags 132. Object tags 132 may represent key characteristics or features of objects depicted in the images, such as type, color, shape, or any unique identifiers 120 like brand names, patterns, or specific physical deformities. The tags may serve as searchable metadata for each image. Processor 104 may filter the second set of image data 136 based on the object tags 132. Filtering the second set of image data 136 may involve querying an image database or repository using the defined tags as search parameters. The search can be singular, based on one tag, or compound, using multiple tags to narrow down the search results further. For example, if the objective is to identify images of red sports cars, the tags "car," "red," and "sports" might be used in conjunction to refine the search. The system may identify images whose tags match the search criteria. This matching process may involve simple tag comparison or more sophisticated algorithms that can interpret tag relevance and hierarchy, ensuring that the images selected are truly representative of the search parameters. The images identified through this tag-based matching process may then be compiled into a subset of source image data 144. This subset represents a curated collection of images that specifically match the object tags and are relevant to the user's needs or the application's requirements.

With continued reference to FIG. 1, processor 104 may identify a subset of source image data 144 from a second set of image data 136 using a source image machine-learning model 148. As used in the current disclosure, a "source image machine-learning model" is a machine-learning model that is configured to identify subset of source image data 144 from the second set of image data 136. Source image machine-learning model 148 may be consistent with the machine-learning model described below in FIG. 2. Inputs to the source image machine-learning model 148 may include first set of image data 112, one or more unique identifiers 120, object data 128, object tags 132, a second set of image data 136, examples of source image data 144, and the like. Outputs to the source image machine-learning model 148 may include the identification of subset of source image data 144. Outputs to the source image machine-learning model 148 may also include the identification of one or more unique identifiers 120 within the second set of image data 136. Source image training data may include a plurality of data entries containing a plurality of inputs that are correlated to a plurality of outputs for training a processor by a machine-learning process. In an embodiment, source image training data may include a plurality of unique identifiers 120 correlated to examples of source image data 144. Source image training data may be received from a database. Source image training data may contain information about first set of image data 112, one or more unique identifiers 120, object data 128, object tags 132, a second set of image data 136, examples of source image data 144, and the like. Source image training data may include a plurality of images of examples of unique identifiers 120. These images may show the exemplary unique identifiers in various positions, angels, lighting, and the like. In an embodiment, source image training data may be iteratively updated as a function of the input and output results of past source image machine-learning model 148 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, source image training data may include a wide variety of images from the second set that encompass the range of scenarios, backgrounds, and conditions under which the unique identifiers 120 appear. This diversity ensures the model can generalize well across different situations. Each image in the source image training data may have the unique identifiers 120 clearly labeled. This is often done by marking the regions of the image where the identifiers are located or tagging the images with annotations that describe the identifiers. For instance, if the identifier is a specific pattern or text, the exact location of this pattern or text in the image may be marked. The training images many include variations such as different lighting conditions, angles, distances, and occlusions. This variation helps the model become robust to changes in image conditions. The dataset may be balanced in terms of the representation of different types of unique identifiers 120. A skewed dataset might bias the model towards more frequently represented identifiers. As the model learns, the source image training data can be periodically updated with new images or more examples of under-represented identifiers. This ongoing addition helps in continuously improving the model's accuracy and adaptability. In some cases, source image training data may include images that do not contain any of the unique identifiers (or have irrelevant patterns or text) is also important. This may teach the model to correctly identify when a unique identifier is not present.

With continued reference to FIG. 1, processor 104 may be configured to update the training data of the source image machine-learning model 148 using user inputs. A source image machine-learning model 148 may use a user input to update its training data, thereby improving its performance and accuracy. In embodiments, the source image machine-learning model 148 may be iteratively updated using input and output results of past iterations of the source image machine-learning model 148. The source image machine-learning model 148 may then be iteratively retrained using the updated source image training data. For instance, and without limitation, source image machine-learning model 148 may be trained using a first set of training data from, for example, and without limitation, a user input or database. The source image machine-learning model 148 may then be updated by using previous inputs and outputs from the source image machine-learning model 148 as a second or updated set of training data to then train the machine learning model for a second training cycle. This process of updating the source image machine-learning model 148 and its associated training data may be continuously done to create subsequent source image machine-learning model 148 to improve the speed and accuracy of the newer source image machine-learning model 148. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the source image machine-learning model 148 and any other machine-learning model/classifier discussed herein.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of source image machine-learning model 148. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the output of the source image machine-learning model 148 may be averaged to determine an accuracy score. In some embodiments, an accuracy score may be determined for identification of unique identifiers 120 within the second set of image data 136. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the source image machine-learning model 148 and/or any other machine-learning model/classifier mentioned herein.

With continued reference to FIG. 1, processor 104 is configured to determine a similarity score 152 as a function of a comparison of the subset of source image data 144 and the one or more unique identifiers 120. As used in the current disclosure, a "similarity score" is a quantitative metric that evaluates the degree to which one or more unique identifiers 120 are found within the subset of source image data 144. The processor 104 may compare the subset of source image data 144 and the one or more unique identifiers 120. This may involve analyzing the images to detect features, patterns, text, or other visual elements that correspond to the unique identifiers 120. The outcome of this comparison may be translated into a similarity score. In an embodiment, multiple source images 144 that reflect a given unique identifier 120 may indicate a strong likelihood that a given object in the image is the object. This may be reflected by the similarity score. In a non-limiting example, a subset of source image data 144 may include a plurality of images depicting an athletic jersey in use in a plurality of athletic competitions. The similarity score between the unique identifiers depicted athletic jersey and the current object may increase due to the unique identifiers 120 presence in multiple images. Additionally, the identification of multiple unique identifiers 120 within a subset of source image data 144 may improve a similarity score 152.

With continued reference to FIG. 1, the similarity score 152 may be a quantitative metric that typically ranges on a predetermined scale (e.g., 0 to 100). A higher score indicates a higher degree of similarity between the image data and the unique identifiers. The processor 104 may also take into account contextual factors that could influence the similarity score, such as image quality, lighting conditions, or angles of capture, adjusting the score accordingly to ensure accuracy. In some cases, a threshold for the similarity score can be set to determine what level of similarity is considered significant or acceptable. Scores above this threshold indicate a strong match between the image data and the unique identifiers. The similarity scores 152 may be normalized or standardized to ensure comparability across different datasets or variables. This means that the score is often scaled to fall within a specific range (i.e., 0 to 1 or −1 to 1). Normalization techniques can include min-max scaling, z-score normalization, or logarithmic transformation. In an embodiment, a similarity score 152 may be expressed as a numerical score, a linguistic value, or an alphabetical score. A non-limiting example, of a numerical score, may include a scale from 1-10, 1-100, 1-1000, and the like. In another non-limiting example, linguistic values may include, "Highly Similar," "Moderately Similar," "Not Similar," and the like. In some embodiments, linguistic values may correspond to a linguistic variable score range. For example, a source image 144 that receives a score between 40-60, on a scale from 1-100, may be considered a "Moderately Similar."

With continued reference to FIG. 1, Processor 104 may rank each image of the subset of source image data 144 according to their scores by implementing a sorting algorithm that orders the source image data 144 based on the quantitative values of their scores. After each image has been scored, the processor may initiate the ranking process. Processor 104 may compare the scores of different source images 144, placing the ones with higher scores at the top of the list and those with lower scores towards the bottom. This ranking may be done in descending order, ensuring that the source images 144 that most closely match the unique identifiers 120 (indicated by higher scores) are prioritized. The processor 104 may also handle images with identical scores by either ranking them equally or using secondary criteria for further differentiation, such photo quality or the source of the image. The result may be an ordered list or a ranked set of source images, systematically arranged from the most similar to the least similar, per the scoring criteria.

With continued reference to FIG. 1, processor 104 may generate a similarity score 152 using a score machine-learning model. As used in the current disclosure, a "score machine-learning model" is a machine-learning model that is configured to generate similarity score 152. Score machine-learning model may be consistent with the machine-learning model described below in FIG. 2. Inputs to the score machine-learning model may include first set of image data 112, one or more unique identifiers 120, object data 128, object tags 132, a second set of image data 136, source image data 144, examples of similarity score 152, and the like. Outputs to the score machine-learning model may include similarity score 152 tailored to the comparison of the subset of source image data 144 and the one or more unique identifiers 120. Score training data may include a plurality of data entries containing a plurality of inputs that are correlated to a plurality of outputs for training a processor by a machine-learning process. In an embodiment, score training data may include a plurality of comparisons of the subset of source image data 144 and the one or more unique identifiers 120 correlated to examples of similarity score 152. Score training data may be received from image database 140. Score training data may contain information about first set of image data 112, one or more unique identifiers 120, object data 128, object tags 132, a second set of image data 136, source image data 144, examples of similarity score 152, and the like. In an embodiment, score training data may be iteratively updated as a function of the input and output results of past score machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 is configured to generate a verification report 156 as a function of the similarity score 152. As used in the current disclosure, a "verification report" is a report that presents the results and analysis of the comparison of the subset of source image data 144 and the one or more unique identifiers 120. This report may detail how closely the images in the subset of source image data 144 match the first set of image data 112 associated with the object 108. Specifically, this report may detail and highlight how closely the subset of source image data 144 match the unique identifiers 120. The verification report 156 may also include a details related to the object data 128. The verification report 156 may include information that supports the report's content, such as locations for the source image data 144, reference materials, or extended data tables, and the like. This may include details about the origins of the subset of source image data 144, such as the time period, location, timelines, or circumstances under which the images were captured. This might include the source of the images, such as specific databases, archives, or collections. The verification report 156 may include a description of the methods and algorithms used for comparing the subset of source image data 144 with the unique identifiers. It may detail the feature extraction process, the criteria for comparison, and the way the similarity scores 152 are calculated. In an embodiment, the verification report 156 may display one or more of the most highly ranked images within the subset of source images 144. These highly ranked images may be highlighted and annotated to display the unique identifiers 120 that was found within the image. For each highlighted image, the report 156 may detail how the unique identifiers are present within it. This could involve showing how specific patterns, text, or other features in the image correspond to the unique identifiers. In some cases, the report 156 may include graphical representation of the comparison and the similarity scores 152. The inclusion of charts, graphs, or other visual aids to represent data more effectively. In some cases, the report may also discuss the accuracy of the comparison process and the confidence levels associated with the similarity scores 152. This might include an analysis of false positives or negatives.

Still referring to FIG. 1, processor 104 may be configured to display the verification report 156 on a display device 160. As used in the current disclosure, a "display device" is a device that is used to display content. A display device 160 may include a user interface. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2A:
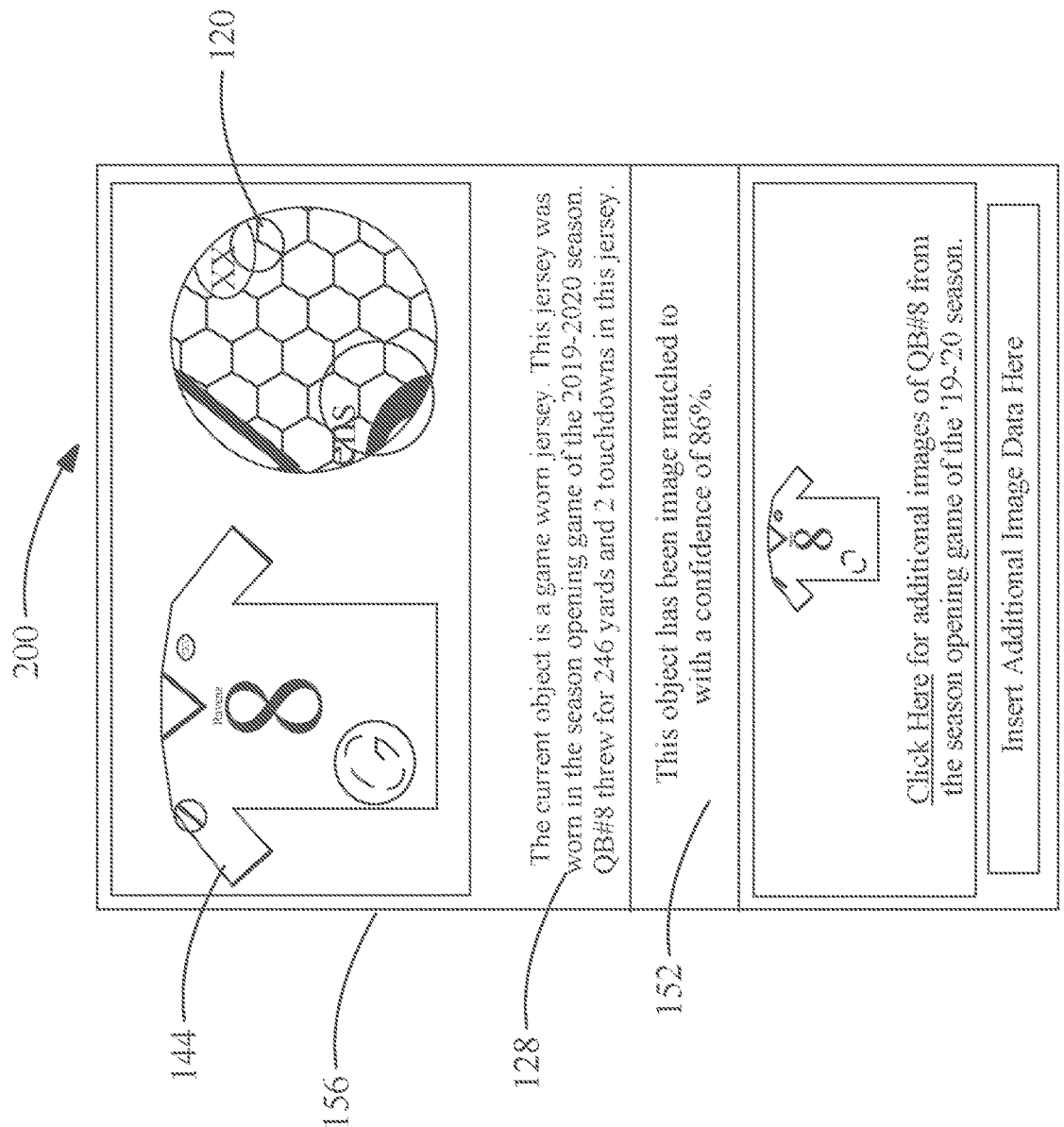
FIG. 2A-B is an exemplary embodiment of a verification report.
Figure 2B:
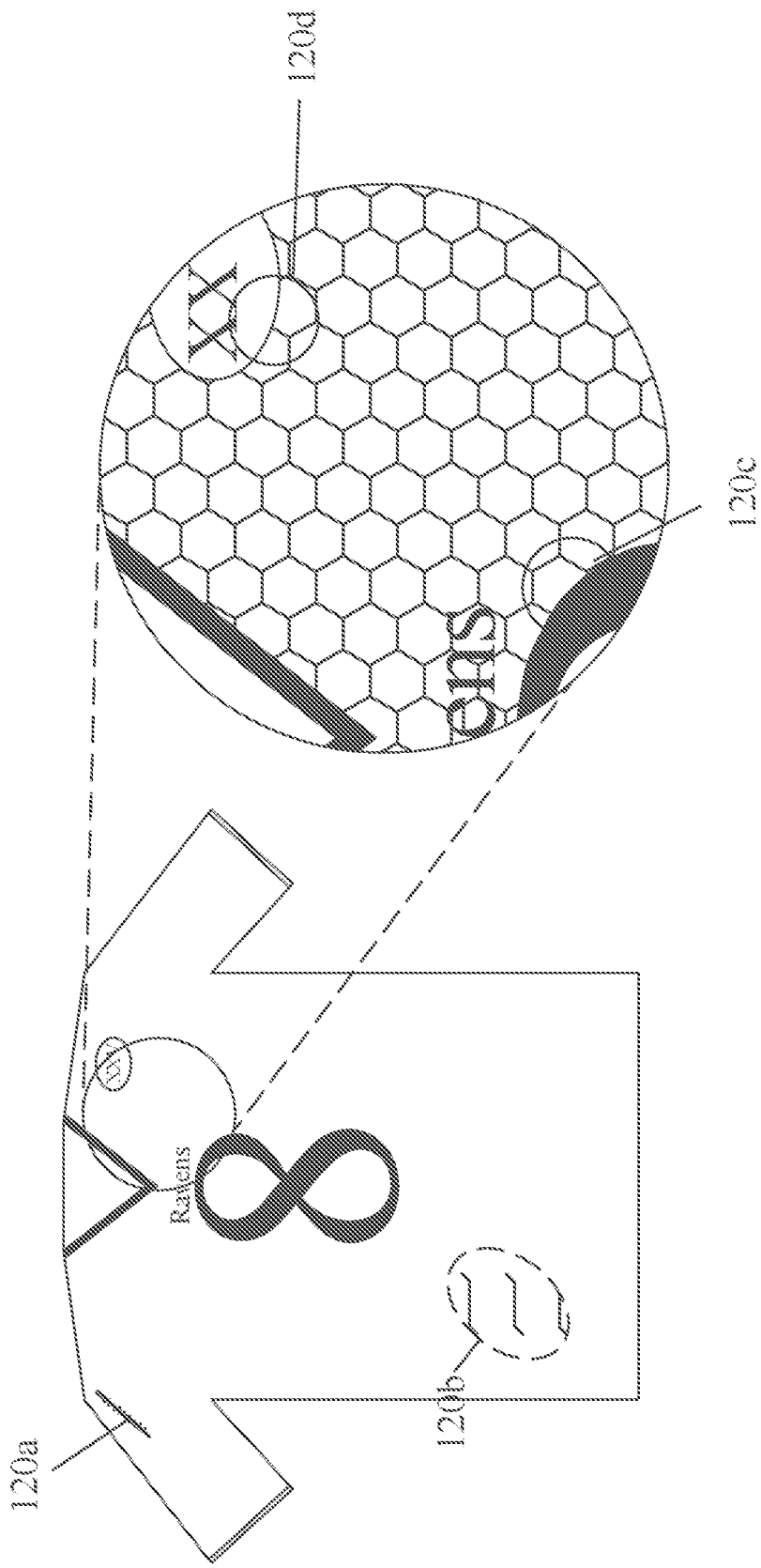

Referring now to FIG. 2A-B, an exemplary embodiment of a verification report. A verification report 156 may present the findings and analysis resulting from the comparison of two specific datasets, such as a subset of source image data 144 against unique identifiers 120. The report may include executive summary, providing an overview of the objectives, methodology, and key findings. The verification report 156 may be configured to present the results of the comparison. These results may be used to inform a user of the authenticity of an object 108. This may be done though image comparison. The highest ranked source images 144 may be highlighted and annotated to show that they are similar to the unique identifiers 120 of the first set of image data 112. Each of these images may be accompanied by object data 128 and other visual representations that indicate how and where the unique identifiers 120 align with features in the images. The report may additionally highlight and explain the similarity scores 152 for these images, offering a quantitative measure of the match. In some cases, the verification report 156 may include a discussion on the accuracy and confidence levels of the comparison process, potentially addressing the occurrence of false positives or negatives.

Referring now to FIG. 2B, an exemplary embodiment of an object 108 as shown in a verification report. The figure depicts an item of clothing associated with an athlete featuring several distinct unique identifiers 120*a-d*. These identifiers may be specific physical characteristics and alterations on the clothing that distinguish it from similar items. In an embodiment, unique identifier 120*a* may be a physical deformity to the object 108 that includes a tear. This unique identifier 120*a* may be located on the shoulder of the item of clothing. The nature of the repair, its location, size, and the stitching pattern used in the repair process all contribute to making this a unique identifier 120*a* of the object 108. In an additional embodiment, unique identifier 120*b* may include a physical deformity. This deformity may include a stain on the object 108. It could be from a specific event, substance, or usage scenario related to the athlete. The size, shape, color, and placement of the stain on the object 108 may contribute to its uniqueness. In a further embodiment, unique identifier 120*c-d* may include the relationship between one or more physical features of the object to a set of mesh holes of an item of clothing. This may involve the interaction between physical features of the clothing, such as an alphanumeric character and a shoulder patch, with a set of mesh holes. The unique identifier 120*c-d* here may be the pattern formed by which mesh holes are covered, uncovered, or partially covered by these features. The placement of these elements in relation to the mesh holes creates a specific pattern that can serve as a unique identifier. The identification of these unique features may be used in authenticating the item of clothing as being associated with the specific athlete. Each unique identifier 120*a-d* may act as a distinctive marker. In a verification or authentication process, these unique identifiers 120 may be examined and compared to source images, potentially using imaging and pattern recognition technology, to confirm the item's authenticity or to trace its history.

Figure 3:
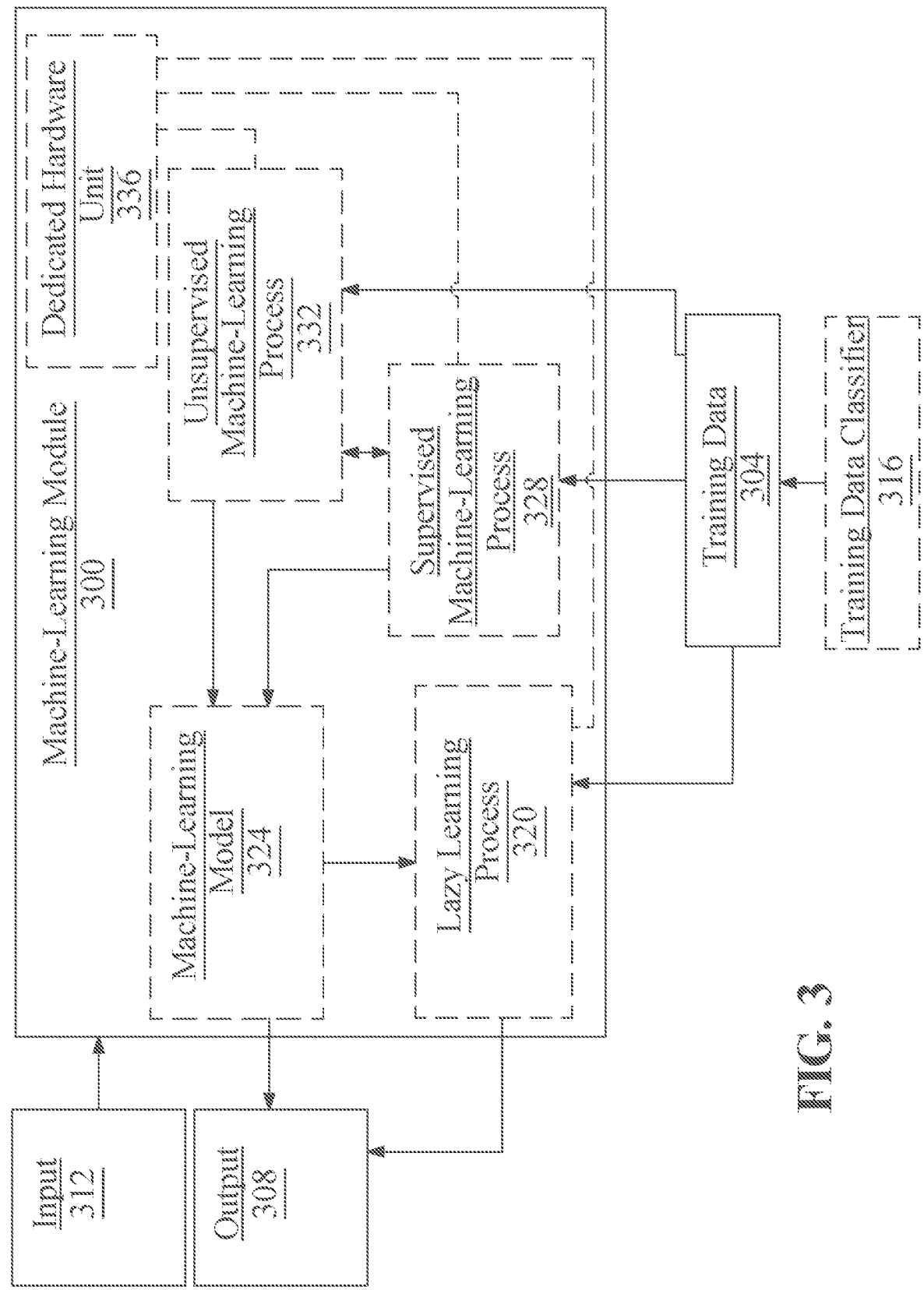
FIG. 3 is a block diagram of an exemplary machine-learning process.

Referring now to FIG. 3, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 200 may correlate any input data as described in this disclosure to any output data as described in this disclosure. As a non-limiting illustrative example examples of one or more unique identifiers as inputs correlated to examples of source image data as outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to unique identifiers 120 that include a physical deformity of the object 108.

With further reference to FIG. 3, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may identify as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Still referring to FIG. 3, machine-learning module 200 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include examples of one or more unique identifiers as described above as inputs, examples of source image data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 200 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
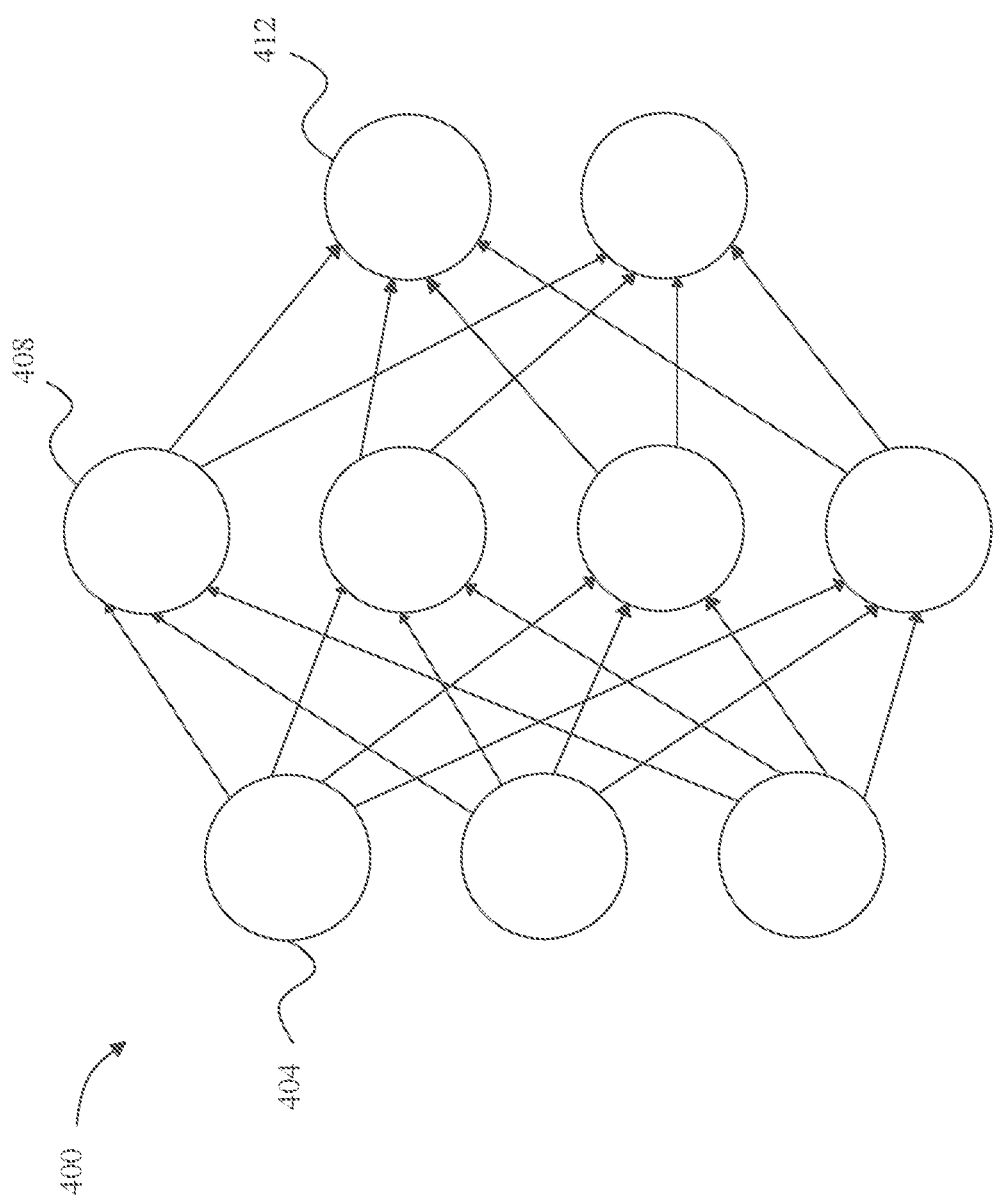
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
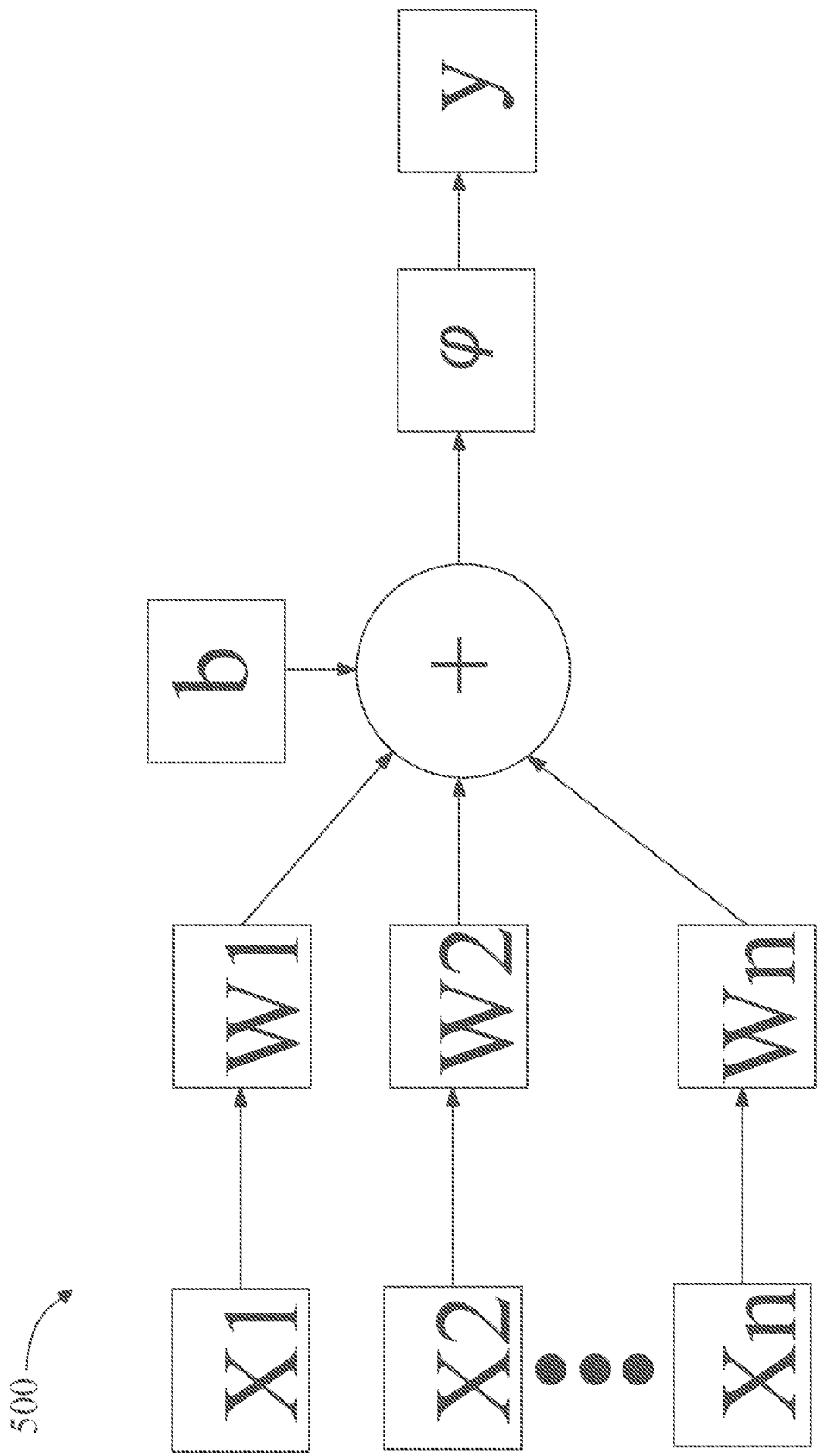
FIG. 5 is a diagram of an exemplary embodiment of a node of a neural network.

Referring now to FIG. 5, an exemplary embodiment of a node of a neural network is illustrated. A node may include, without limitation, a plurality of inputs x; that may receive numerical values from inputs to a neural network containing the node and/or from other nodes. Node may perform a weighted sum of inputs using weights $w_i$ that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
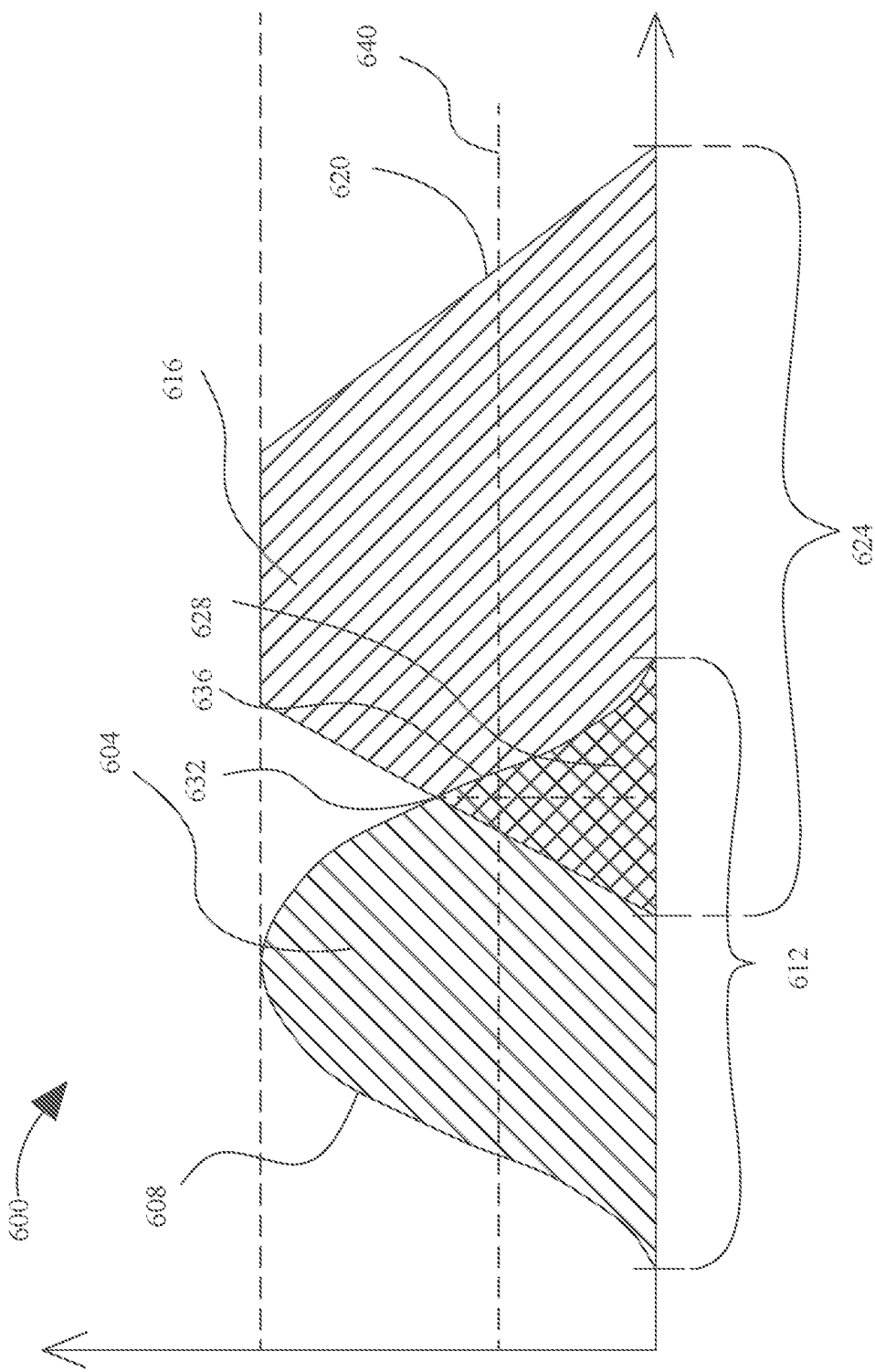
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example, and without limitation, the parameters, weights, and/or coefficients of the membership functions may be tuned using any machine-learning methods for the name/version matching as described herein. In another non-limiting embodiment, the fuzzy set may represent a subset of source image data 144 and a one or more unique identifiers 120 from FIG. 1.

Alternatively, or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input subset of source image data 144 and one or more unique identifiers 120. For instance, an acceptance variable may represent a first measurable value pertaining to the classification of subset of source image data 144 to one or more unique identifiers 120. Continuing the example, an output variable may represent [Output] associated with the user. In an embodiment, subset of source image data 144 and/or one or more unique identifiers 120 may be represented by their own fuzzy set. In other embodiments, the classification of the data into [Output] may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an arca beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any subset of source image data 144 and one or more unique identifiers 120. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing subset of source image data 144 and one or more unique identifiers 120 for combination to occur as described above. Each threshold may be established by one or more user inputs. Alternatively, or additionally, each threshold may be tuned by a machine-learning and/or statistical process, for instance and without limitation as described in further detail below.

In an embodiment, a degree of match between fuzzy sets may be used to rank one resource against another. For instance, if both subset of source image data 144 and one or more unique identifiers 120 have fuzzy sets, [Output] may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
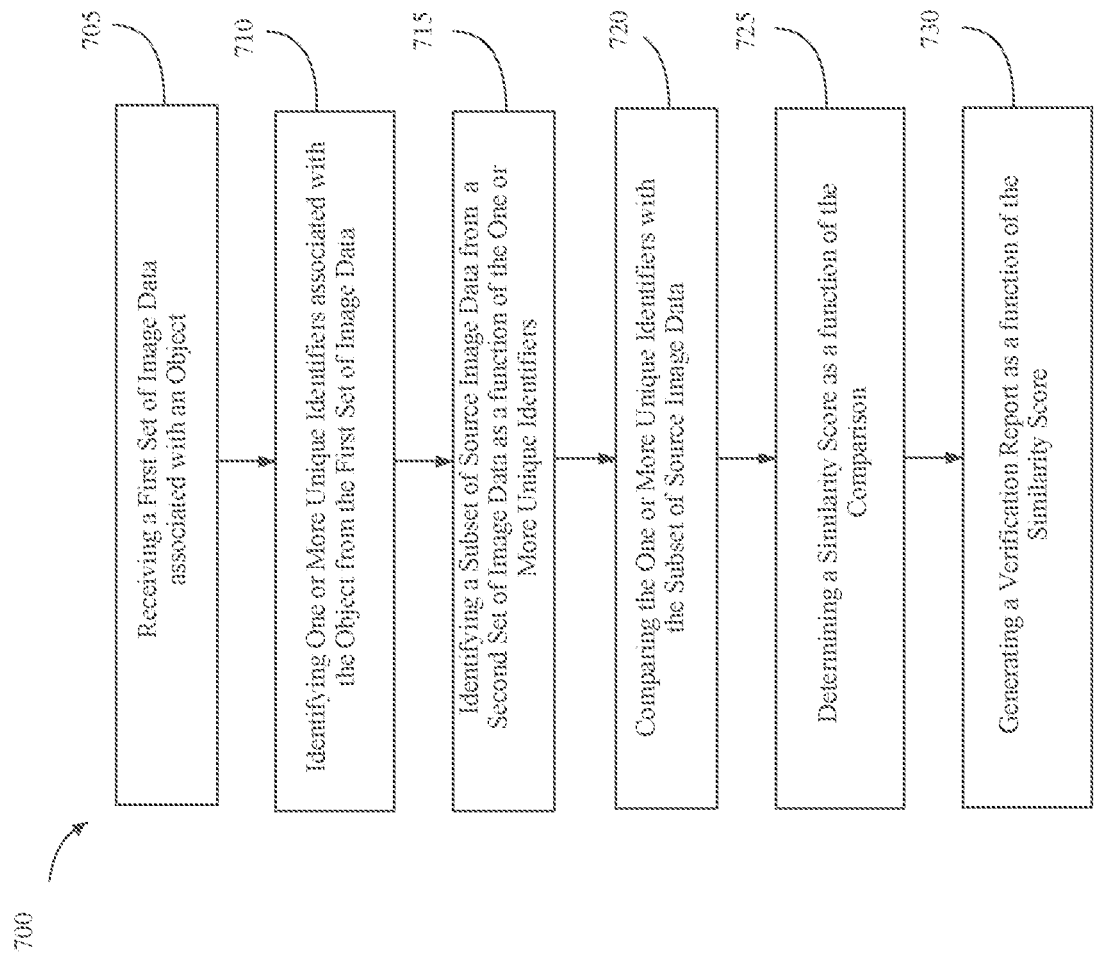
FIG. 7 is a flow diagram of an exemplary method for the identification of source images associated with an object.

Referring now to FIG. 7, a flow diagram of an exemplary method 700 for the identification of source images associated with an object is illustrated. At step 705, method 700 includes receiving, using at least a processor, a first set of image data associated with an object. This may be implemented as described and with reference to FIGS. 1-7. In an embodiment, the object may include sports memorabilia. In an additional embodiment, receiving the first set of image data may include receiving the first set of image data from at least a camera.

Still referring to FIG. 7, at step 710, method 700 includes identifying, using the at least a processor, one or more unique identifiers associated with the object from the first set of image data. This may be implemented as described and with reference to FIGS. 1-7. In an embodiment, the one or more unique identifiers may include the proximity between one or more physical features of the object. Alternatively, the one or more unique identifiers may include the relationship between one or more physical features of the object to a set of mesh holes of an item of clothing. In some cases, the one or more unique identifiers may include a physical deformity of the object.

Still referring to FIG. 7, at step 715, method 700 includes identifying, using the at least a processor, a subset of source image data from a second set of image data as a function of the one or more unique identifiers. This may be implemented as described and with reference to FIGS. 1-7. In an embodiment, the method may include generating, using the at least a processor, object data as a function of the one or more unique identifiers. In some cases, generating object data further may include tagging the plurality of image data with one or more object tags, wherein the one or more object tags comprises hierarchical object tags. In another embodiment, identifying the subset of source image data may include identifying the second set of image data by querying an image database using object data. identifying the subset of source image data may also include filtering the second set of image data as a function of the hierarchical object tags. Identifying the subset of source image data may also include identifying the subset of source image data by identifying the one or more unique identifiers within a second set of image data. In an additional embodiment, wherein the method may further include identifying, using the at least a processor, the second set of image data using a webcrawler.

Still referring to FIG. 7, at step 720, method 700 includes comparing, using the at least a processor, the one or more unique identifiers with the subset of source image data. This may be implemented as described and with reference to FIGS. 1-7.

Still referring to FIG. 7, at step 725, method 700 includes determining, using the at least a processor, a similarity score as a function of the comparison. This may be implemented as described and with reference to FIGS. 1-7.

Still referring to FIG. 7, at step 730, method 700 includes generating, using the at least a processor, a verification report as a function of the similarity score. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
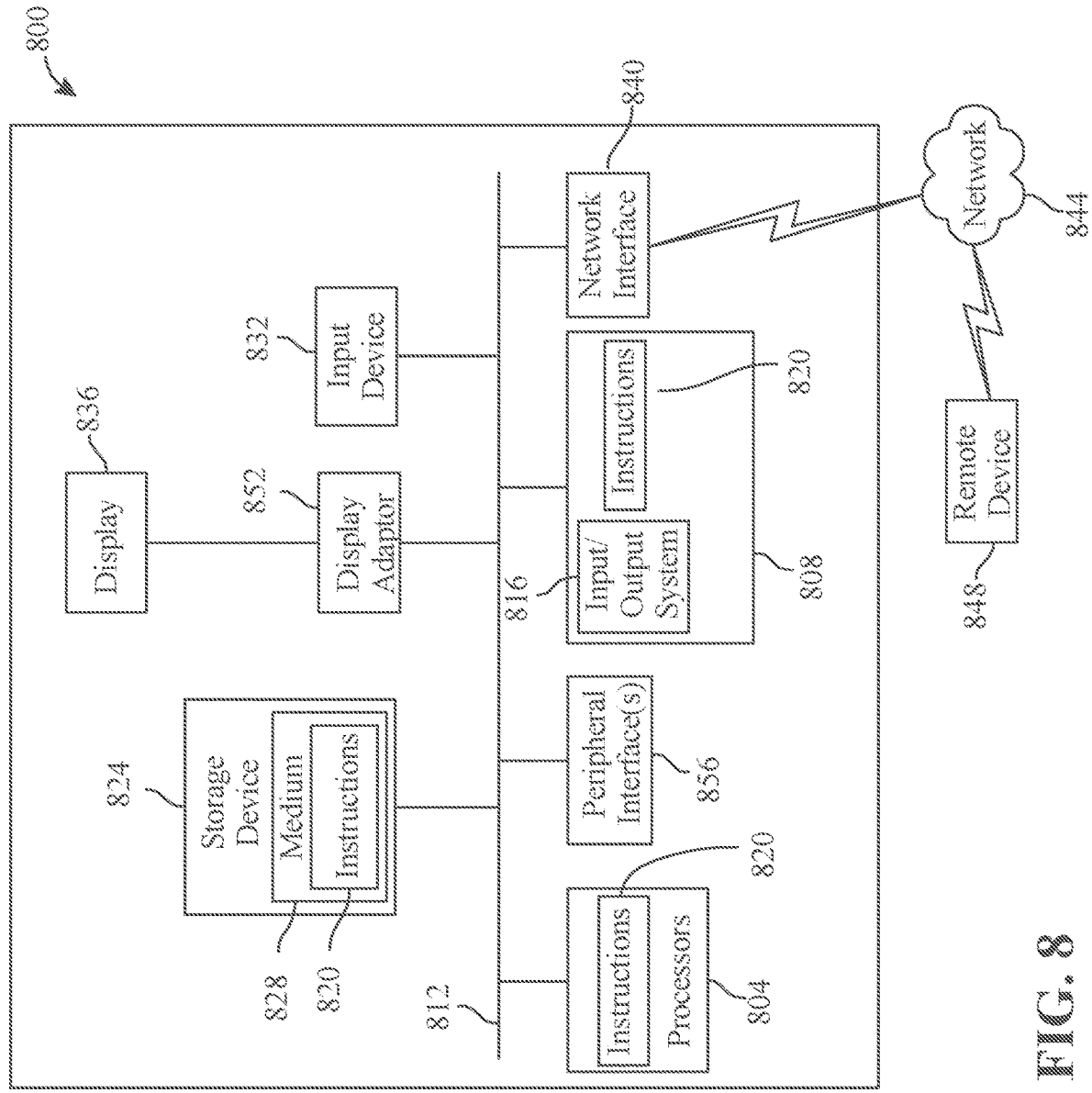
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for the identification of source images associated with an object, wherein the apparatus comprises:
   at least a processor; and
   a memory communicatively connected to the at least a processor, wherein the memory contains instructions configuring the at least a processor to:
   receive a first set of image data associated with an object;
   identify one or more unique identifiers comprising physical deformities including a tear and/or stain associated with the object from the first set of image data;
   identify a subset of source image data from a second set of image data as a function of the one or more unique identifiers;
   compare the one or more unique identifiers with the subset of source image data;
   determine a similarity score as a function of the comparison; and
   generate a verification report as a function of the similarity score.

2. The apparatus of claim 1, wherein the one or more unique identifiers comprises a proximity between one or more physical features of the object.

3. The apparatus of claim 1, wherein the one or more unique identifiers comprises a relationship between one or more physical features of the object to a set of mesh holes of an item of clothing.

4. The apparatus of claim 1, wherein the memory further instructs the processor to generate object data as a function of the one or more unique identifiers.

5. The apparatus of claim 4, wherein generating the object data further comprises tagging the first set of image data with one or more object tags, wherein the one or more object tags comprises hierarchical object tags.

6. The apparatus of claim 5, identifying the subset of source image data comprises:
   identifying the second set of image data by querying an image database using object data;
   filtering the second set of image data as a function of the hierarchical object tags; and
   identifying the subset of source image data by identifying the one or more unique identifiers within a second set of image data.

7. The apparatus of claim 1, wherein identifying the subset of source image data comprises:
   iteratively training a source image machine learning model as a function of source image training data, wherein source image training data comprises examples of one or more unique identifiers correlated to examples of source image data; and
   identifying the subset of source image data as a function of the one or more unique identifiers using the source image machine learning model.

8. The apparatus of claim 1, wherein the object comprises sports memorabilia.

9. The apparatus of claim 1, wherein receiving the first set of image data comprises receiving the first set of image data from at least a camera.

10. A method for the identification of source images associated with an object, wherein the method comprises:
    receiving, using at least a processor, a first set of image data associated with an object;
    identifying, using the at least a processor, one or more unique identifiers comprising physical deformities including a tear and/or stain associated with the object from the first set of image data;
    identifying, using the at least a processor, a subset of source image data from a second set of image data as a function of the one or more unique identifiers;
    comparing, using at least a processor, the one or more unique identifiers with the subset of source image data;

determining, using the at least a processor, a similarity score as a function of the comparison; and generating, using the at least a processor, a verification report as a function of the similarity score.

11. The method of claim 10, wherein the one or more unique identifiers comprises a proximity between one or more physical features of the object.

12. The method of claim 10, wherein the one or more unique identifiers comprises a relationship between one or more physical features of the object to a set of mesh holes of an item of clothing.

13. The method of claim 10, wherein the method further comprises generating, using the at least a processor, object data as a function of the one or more unique identifiers.

14. The method of claim 13, wherein the generating object data further comprises tagging the first set of image data with one or more object tags, wherein the one or more object tags comprises hierarchical object tags.

15. The method of claim 14, identifying the subset of source image data comprises:

identifying the second set of image data by querying an image database using object data;

filtering the second set of image data as a function of the hierarchical object tags; and identifying the subset of source image data by identifying the one or more unique identifiers within a second set of image data.

16. The method of claim 10, wherein identifying the subset of source image data comprises:

iteratively training a source image machine learning model as a function of source image training data, wherein source image training data comprises examples of one or more unique identifiers correlated to examples of source image data; and identifying the subset of source image data as a function of the one or more unique identifiers using the source image machine learning model.

17. The method of claim 10, wherein the object comprises sports memorabilia.

18. The method of claim 10, wherein receiving the first set of image data comprises receiving the first set of image data from at least a camera.

\* \* \* \* \*